(12) United States Patent
Muncie

(10) Patent No.: US 9,387,558 B2
(45) Date of Patent: Jul. 12, 2016

(54) RIGGING TABLE FOR ASSEMBLING TRUSSES AND METHOD OF USE THEREOF

(75) Inventor: Jerry Muncie, St. Joe, IN (US)

(73) Assignee: NUCOR CORPORATION, Charlotte, NC (US)

( * ) Notice: Subject to any disclaimer, the term of this patent is extended or adjusted under 35 U.S.C. 154(b) by 1117 days.

(21) Appl. No.: 13/278,215

(22) Filed: Oct. 21, 2011

(65) Prior Publication Data

US 2012/0032387 A1 Feb. 9, 2012

Related U.S. Application Data

(62) Division of application No. 12/126,598, filed on May 23, 2008, now Pat. No. 8,141,252.

(51) Int. Cl.
*B23P 19/04* (2006.01)

(52) U.S. Cl.
CPC ............ *B23P 19/04* (2013.01); *Y10T 29/49625* (2015.01); *Y10T 29/5397* (2015.01)

(58) Field of Classification Search
CPC .............................. B23Q 16/001; B25B 11/02
USPC ............ 269/37, 55, 60, 291, 289 R; 29/281.1
See application file for complete search history.

(56) References Cited

U.S. PATENT DOCUMENTS

| | | |
|---|---|---|
| 2,646,101 A | 7/1953 | Ferguson |
| 2,983,292 A | 5/1961 | McKinley |
| 3,603,244 A | 9/1971 | Jureit |
| 3,896,717 A | 7/1975 | Schmitt et al. |
| 3,939,764 A | 2/1976 | McCormack |
| 4,044,093 A | 8/1977 | Jureit |
| 4,071,061 A | 1/1978 | Schneider |
| 4,104,962 A | 8/1978 | Castillo |
| 4,245,828 A | 1/1981 | Aldag et al. |
| 4,295,269 A | 10/1981 | Wright |
| 4,379,426 A | 4/1983 | Thompson et al. |

(Continued)

FOREIGN PATENT DOCUMENTS

| | | |
|---|---|---|
| CA | 666281 | 7/1963 |
| CA | 1058844 | 7/1979 |

(Continued)

OTHER PUBLICATIONS

Supplemental Search Report dated Oct. 26, 2012 for Application No. 09751671.0.

*Primary Examiner* — Lee D Wilson
(74) *Attorney, Agent, or Firm* — Moore & Van Allen PLLC; Jeffrey R. Gray

(57) ABSTRACT

A rigging table and system for assembling trusses using a rigging table. An embodiment of a rigging table includes a base having a generally longitudinal axis and a generally lateral extent, and at least two bunk assemblies moveable along the base in at least the generally longitudinal axis such that each bunk assembly is capable of being positioned on the base relative to another bunk assembly. Each bunk assembly may include a frame extending along the lateral extent of the base, a pair of guides slidably positioned on the frame to move generally transverse to the longitudinal axis of the base toward and away from each other and able to be fastened in position on the frame, and a pair of automated clamp members each positioned relative to and moveable with one of the guides on the frame, to accommodate assembly of different sized trusses.

37 Claims, 14 Drawing Sheets

(56) References Cited

U.S. PATENT DOCUMENTS

| | | | | |
|---|---|---|---|---|
| 4,567,821 | A | 2/1986 | McDonald | |
| 4,570,913 | A | 2/1986 | Rosser | |
| 4,660,815 | A | 4/1987 | Rosser | |
| 4,669,184 | A | 6/1987 | Castillo | |
| 4,748,786 | A | 6/1988 | Hannah | |
| 4,875,666 | A | 10/1989 | Hain | |
| 5,085,414 | A | 2/1992 | Weaver | |
| 5,342,030 | A | 8/1994 | Taylor | |
| 5,385,339 | A | 1/1995 | Williams | |
| 5,415,383 | A * | 5/1995 | Ausilio | 269/238 |
| 5,608,970 | A | 3/1997 | Owen | |
| 5,617,622 | A | 4/1997 | Anderson | |
| 5,702,095 | A | 12/1997 | Williams | |
| 5,837,014 | A | 11/1998 | Williams | |
| 5,854,747 | A | 12/1998 | Fairlie | |
| 5,933,957 | A | 8/1999 | Haase | |
| 5,941,514 | A | 8/1999 | Burcaw | |
| 5,947,460 | A | 9/1999 | Williams | |
| 5,984,287 | A | 11/1999 | Fitzsimmons | |
| 6,155,549 | A | 12/2000 | Burcaw | |
| 6,267,365 | B1 | 7/2001 | Anglin et al. | |
| 6,364,302 | B2 * | 4/2002 | Ausilio | 269/32 |
| RE37,797 | E | 7/2002 | Haase | |
| 6,518,535 | B2 | 2/2003 | Yoneya et al. | |
| 6,560,858 | B1 | 5/2003 | McAdoo | |
| 6,629,354 | B1 * | 10/2003 | Kline | 29/559 |
| 6,634,631 | B2 | 10/2003 | Hebert | |
| 6,712,347 | B1 | 3/2004 | Fredrickson et al. | |
| 6,762,390 | B2 | 7/2004 | Theurer et al. | |
| 6,817,090 | B1 | 11/2004 | McAdoo et al. | |
| 6,899,324 | B2 | 5/2005 | Fredrickson et al. | |
| 6,978,987 | B2 | 12/2005 | Kanjee | |
| 7,021,614 | B2 | 4/2006 | Hubbard | |
| 7,089,667 | B2 | 8/2006 | McAdoo | |
| 7,091,440 | B2 | 8/2006 | Gabbianelli | |
| 7,093,829 | B2 | 8/2006 | Fredrickson et al. | |
| 7,140,100 | B2 | 11/2006 | Kanjee | |
| 7,316,068 | B2 | 1/2008 | McAdoo et al. | |
| 7,341,246 | B2 * | 3/2008 | Donohue | 269/37 |
| 7,448,120 | B2 * | 11/2008 | Ohmori et al. | 29/27 C |
| 7,608,801 | B2 | 10/2009 | Inoue et al. | |
| 7,753,351 | B2 * | 7/2010 | Yajima et al. | 269/152 |
| 8,393,605 | B2 * | 3/2013 | Yang et al. | 269/287 |
| 8,534,653 | B2 * | 9/2013 | Huisken et al. | 269/63 |
| 2003/0037450 | A1 | 2/2003 | Reed | |
| 2003/0196326 | A1 | 10/2003 | McAdoo | |
| 2005/0055955 | A1 | 3/2005 | McAdoo et al. | |
| 2005/0121844 | A1 | 6/2005 | Fredrickson et al. | |
| 2005/0210678 | A1 | 9/2005 | Thurston et al. | |
| 2006/0071383 | A1 | 4/2006 | Rupe et al. | |
| 2009/0096143 | A1 * | 4/2009 | Wampler, II | 269/10 |
| 2009/0289403 | A1 * | 11/2009 | Muncie | 269/152 |

FOREIGN PATENT DOCUMENTS

| | | |
|---|---|---|
| CA | 2185380 | 3/2004 |
| DE | 37 05 269 A1 | 8/1987 |
| EP | 0028983 | 5/1981 |
| FR | 2782290 | 2/2000 |
| FR | 2816231 | 5/2002 |
| GB | 567988 | 3/1945 |
| GB | 1314398 | 4/1973 |
| IT | 1236323 | 2/1993 |
| JP | 05-318182 | 3/1993 |

* cited by examiner

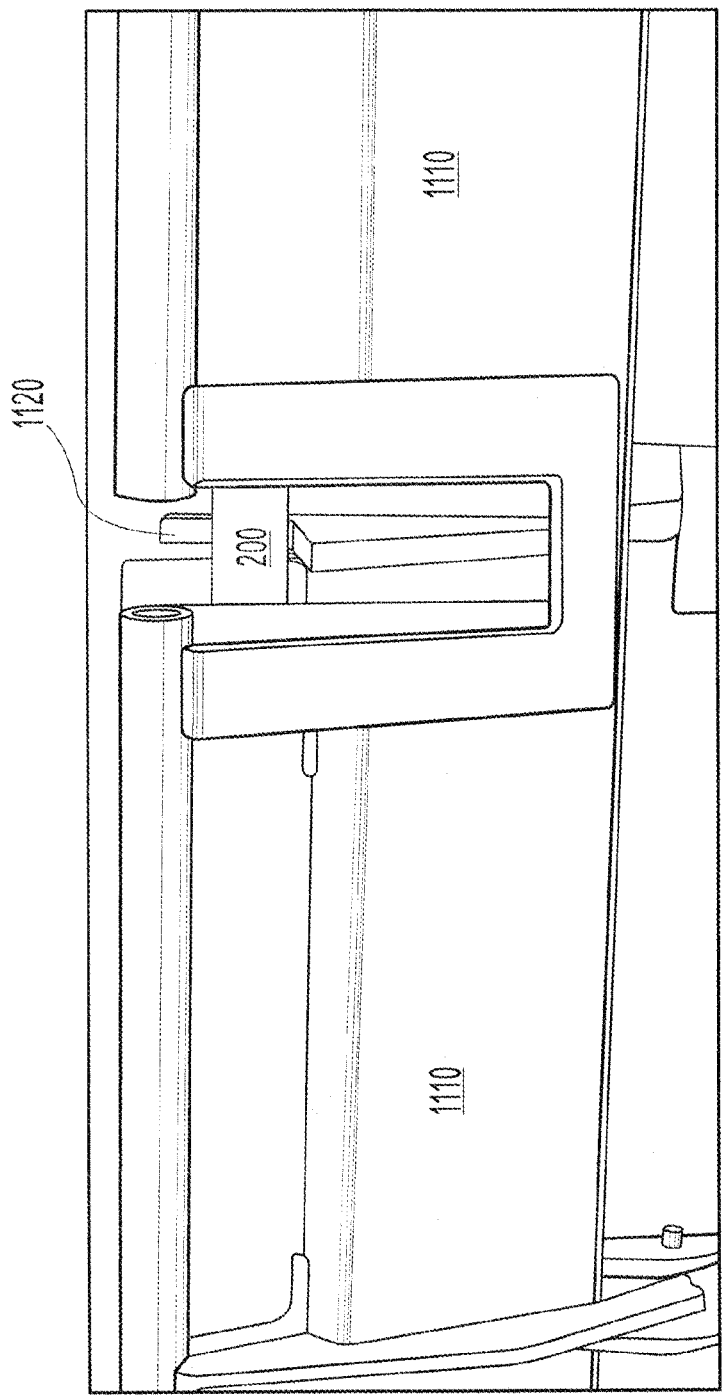

RIGGING TABLE FOR ASSEMBLING TRUSSES AND METHOD OF USE THEREOF

This application is a divisional of U.S. patent application Ser. No. 12/126,598, filed May 23, 2008, the disclosure of which is incorporated herein by reference.

BACKGROUND AND SUMMARY

The present invention relates to rigging tables, and to methods and systems for assembling trusses using a rigging table.

Various processes and techniques have been used to manually fabricate steel open-web trusses. Such fabrication techniques may involve processes including cut-out, rigging, welding, inspection, and painting operations. The welding operation can be the bottleneck or rate-limiting operation limiting production capacity. In a cut-out operation, steel angle and rod chord and web components are cut to length with hydraulic shears, cut-off dies, hydraulic presses, or other cutting devices. The cut-out operation may further include shaping the end of the web components to form a desired shape and size. In a rigging operation, assembly workers, or riggers, arrange the sized components in proper position and clamp and tack-weld the components in place. In a welding operation, a team of welders apply structural welds at component connections to give the truss strength. In an inspection operation, an inspector verifies material sizes, component lengths, welds, and positions. In a painting operation, a truss is dipped in a tank of coating material, such as a water-based primer, drained of excess primer, dried, and then loaded onto a transport out of the plant.

An assembly table or rigging table may be used, which includes fixtures for positioning the chord and web components in position while the components are clamped and tack-welded together. The long (e.g., up to 65 feet) structural components at the top and bottom of the trusses are known as chords. Chords may be supplied from a position behind the riggers on either side of the rigging table. In the past, the riggers had to turn away from the table, work together to lift a chord overhead, turn back toward the table while holding the chord, and lower the chord into the appropriate fixtures on the table. Once the riggers added the shorter web components, or webs, to the chord portion on the table, a second chord portion may be added. The components were then clamped and tack welded together. In the past, the riggers typically used hand clamps for this purpose. The riggers then send the rigged truss to the welding area on transfer rollers.

Manual lifting of the chords can be inefficient. When lifting heavy chords overhead, the riggers take time and precautions to handle the chords safely. Manual hand clamping of truss components is also inefficient, requiring hand strength and operator judgment as to placement.

What has been needed is a rigging table that automates assembly of trusses of different sizes and allows easy adjustability.

A rigging table is presently disclosed for assembling trusses comprising:
a) a base having a generally longitudinal axis and a generally lateral extent;
b) at least two bunk assemblies movable along the base in at least the generally longitudinal axis, each bunk assembly capable of being positioned on the base relative to another bunk assembly;
c) each bunk assembly comprising:
 a frame extending along the lateral extent of the base;
 a pair of guides slidably positioned on the frame to move generally transverse to the longitudinal axis of the base toward and away from each other and able to be fastened in position on the frame to accommodate assembly of different sized trusses; and
 a pair of automated clamp members each positioned relative to and moveable with one of the guides on the frame to accommodate assembly of different sized trusses, each clamp member capable of securing an intersection of a chord and one or more webs to facilitate assembly of a truss.

The guides may be capable of being indexed along the frame in predetermined increments adapted to assembly of different sized trusses and fastened to the frame to facilitate assembly of a truss. As an alternate, each guide may be capable of alternatively being slidable along the frame and fastened in position to facilitate assembly of different size trusses, or being indexed along the frame in predetermined increments adapted to assembly of different sized trusses and fastened to the frame to facilitate assembly of a truss.

Each bunk assembly may have clamp members each comprising:
a stop portion capable of positioning a chord and one or more webs during assembly of a truss; and
a clamp arm having an operative position capable of securing the chords and one or more webs in relation to the stop portion for assembly of the truss, and retracting after the truss is assembled.

Each clamp member may further comprise an actuator capable of moving the clamp arm to secure the chord and one or more webs during assembly of a truss and retracting the clamp arm after the truss is assembled. Each actuator may include a mechanism selected from the group consisting of a servo mechanism, a hydraulic mechanism, and a pneumatic mechanism, and is capable of driving the clamp arm between the securing and retracting positions. Each actuator may, for example, include two actuating cylinders capable of being extended and retracted, and a chain connected between the two actuating cylinders about a sprocket such that the clamp arm is driven by the sprocket to move between the securing and retracting positions. Alternatively, each actuator may include a rack and pinion capable of driving the clamp arm between securing and retracting positions.

Each stop portion may include a nesting portion capable of positioning a chord portion of a truss during assembly. The nesting portion of each stop portion may be formed by an inner block and an outer block enabling the chord portion to be positioned there between.

The rigging table may further include at least one release member capable of disengaging an assembled truss from the clamp members. A release member may be attached to each frame of each bunk assembly.

A bunk assembly may include rollers capable of allowing assembled trusses to move generally longitudinally along the base, and at least one tilt arm capable of moving an assembled truss onto the rollers. Each roller may be attached to each frame of each bunk assembly.

The base of the rigging table may include rails extending along the generally longitudinal axis and are capable of supporting at least two bunk assemblies on a plurality of guide wheels, for example, attached to the frames of the bunk assemblies. The base rails are capable of allowing the bunk assemblies to move on the rails and be positioned to accommodate assembly of different size trusses.

The base of the rigging table may also include stops adjacent each lateral extent of the base, capable of selectively engaging at least a portion of the frame such that when the frame is positioned relative to the stops adjacent one lateral extent, a zero camber is provided in the assembled truss, and when the frame is positioned relative the stops adjacent the opposite lateral extent, a standard camber is provided in the assembled truss.

The rigging table may also include conveyors capable of moving chord portions, selected for a given truss to be assembled, into position under the bunk assemblies adjacent the lateral extent of the frames thereof. The rigging table may further include automated arms operative to engage a chord portion positioned under the bunk assemblies and move the chord portion to enable positioning the chord portion relative to the frame and guides for assembly of a truss. The rigging table may include an automated worker guard panel that is capable of moving to enable the chord portion to be moved from beneath the bunk assemblies to above the bunk assemblies for positioning for assembly of a truss, and moving back to facilitate movement of workers adjacent the lateral extent of the base.

A bunk assembly is disclosed for a rigging table comprising:
a) a frame extending along a longitudinal extent and a lateral extent;
b) a pair of guides slidably positioned on the frame to move generally along the lateral extent toward and away from each other and able to be fastened in position on the frame to accommodate assembly of different size trusses; and
c) a pair of automated clamp members each positioned relative to and moveable with one of the guides on the frame to accommodate assembly of different sized trusses, each clamp member capable of securing an intersection of a chord and one or more webs to facilitate assembly of a truss.

The guides may be capable of being indexed along the frame in predetermined increments adapted to assembly of different sized trusses and fastened to the frame to facilitate assembly of a truss. Alternately, each guide of the bunk assembly may be capable of alternately being slidable along the frame and fastened in position to facilitate assembly of different size trusses, or being indexed along the frame in predetermined increments adapted to assembly of different sized trusses and fastened to the frame to facilitate assembly of a truss.

Each clamp member of the bunk assembly may include a stop portion capable of positioning a chord and one or more webs during assembly of a truss, and a clamp arm having an operative position capable of securing a chord and one or more webs in relation to the stop portion for assembly of the truss, and retracting after the truss is assembled. Each clamp member may include an actuator capable of moving the clamp arm to secure the components during assembly of a truss and retracting the clamp arm after the truss is assembled.

Each actuator may include a mechanism selected from the group consisting of a servo mechanism, a hydraulic mechanism, and a pneumatic mechanism, capable of driving the clamp arm between the securing and retracting positions. Each actuator may include, for example, two actuating cylinders capable of being extended and retracted, and a chain connected between the two actuating cylinders about a sprocket such that the clamp arm is driven by the sprocket to move between the securing and retracting positions. Alternatively, each actuator may include a rack and pinion capable of driving the clamp arm between the securing and retracting positions.

Each stop portion may include a nesting portion capable of positioning a chord portion of a truss during assembly. The nesting portion of each stop portion may be formed by an inner block and an outer block enabling a chord portion to be positioned there between.

The bunk assembly may include at least one release member capable of disengaging an assembled truss from the clamp members. The release member may be attached to the frame of the bunk assembly.

The bunk assembly may further include rollers capable of allowing assembled trusses to move generally longitudinally along a base of the rigging table, and at least one tilt arm capable of moving an assembled truss onto the rollers. At least one roller may be attached to the frame of the bunk assembly. The bunk assembly may include a plurality of guide wheels attached to the frame and capable of allowing the bunk assembly to move on rails and be positioned to accommodate assembly of different sized trusses.

The bunk assembly may further include stops for the guides, on each lateral extent of the bunk assembly, such that when the guides are positioned relative to the stops from one side, a zero camber is provided in the assembled truss, and when the guides are positioned relative to the stops at the opposite side, a standard camber is provided in the assembled truss.

A method is disclosed of assembling truss elements on a rigging table comprising:
a) assembling at least two bunk assemblies for a rigging table with each bunk assembly comprising a frame extending along a lateral extent and a longitudinal extent, a pair of guides slidably positioned on the frame to move generally along the lateral extent toward and away from each other and able to be fastened in position on the frame to accommodate assembly of different sized trusses, and a pair of automated clamp members each positioned relative to an moveable with one of the guides on the frame to accommodate assembly of different sized trusses, each clamp member capable of securing an intersection of a chord and one or more webs to facilitate assembly of a truss;
b) positioning each bunk assembly along the rigging table in desired relation to another bunk assembly to assemble trusses of a desired size;
c) positioning clamp members along the guides on each bunk assembly in desired relation to the other clamp members to assemble trusses of the desired size; and
d) positioning chords and webs of a truss and actuating the clamp members to hold the chords and webs is desired location to assemble a truss of the desired size.

The method may further include securing chords and webs of a truss using a clamp arm in relation to a stop portion during assembly of a truss, and at least tack-welding the chords and webs together to assemble a truss. The method may further include the further step of lifting the tack-welded truss upward above the bunk assemblies.

These and other advantages and novel features, as well as details of illustrated embodiments thereof, will be more fully understood from the following description and drawings. Further disadvantages of conventional, traditional, and proposed approaches will become apparent to one of skill in the art, from a description of embodiments of the systems and methods as set forth in the remainder of the present application with reference to the drawings.

BRIEF DESCRIPTION OF THE DRAWINGS

FIG. 16 is a partial perspective front view of the chord portion lifting arm in a retracted position before lifting a chord portion off of a chord portion conveyor.

DETAILED DESCRIPTION OF THE DRAWINGS

A rigging table, for assembling trusses, that includes adjustable bunk assemblies is disclosed. As used herein, the term "truss" means an assembly of chords and webs (e.g., steel chords and webs) as generally used in construction. Such an assembly of chords and webs is sometimes also referred to as a joist or a girder.

Figure 1:
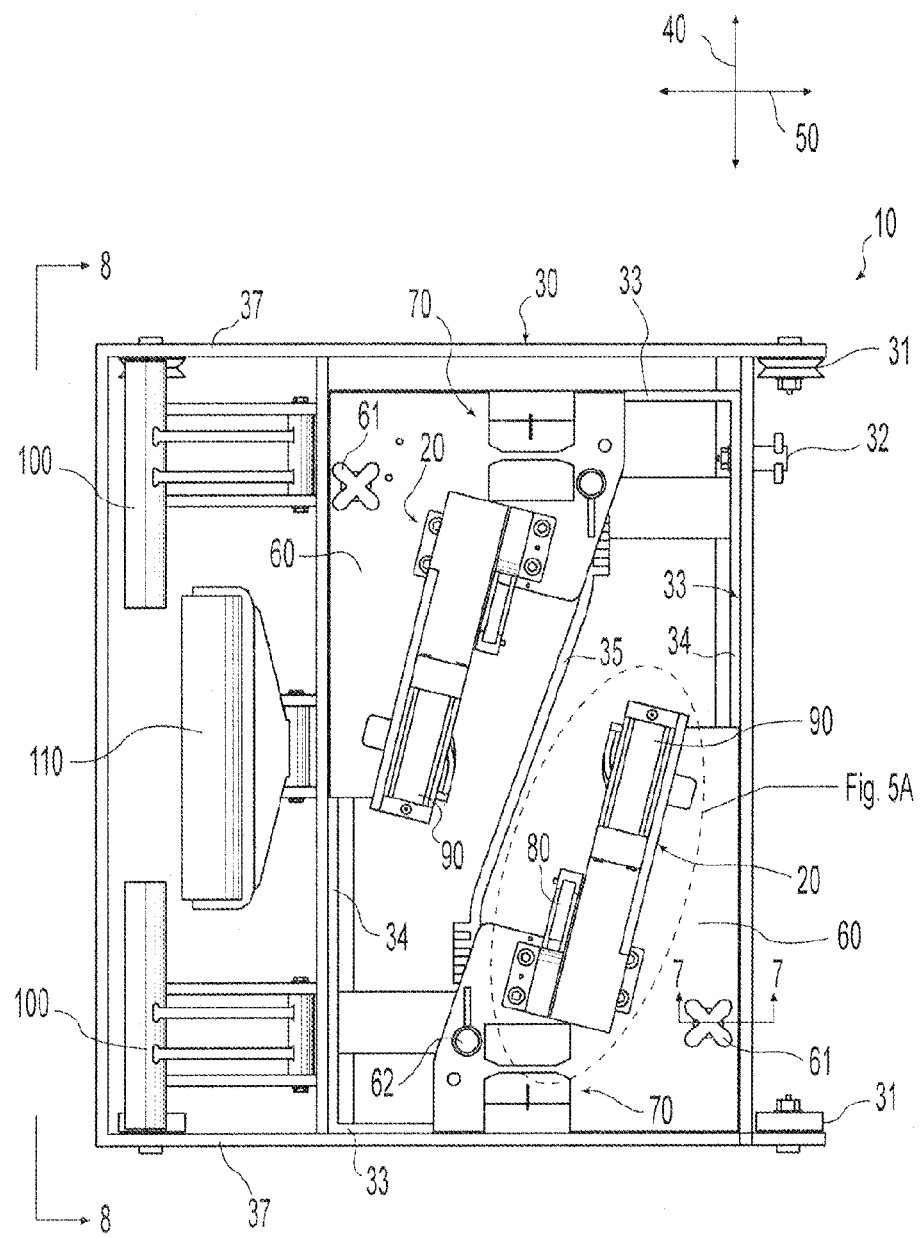
FIG. 1 is a diagrammatical plan view of a bunk assembly used in assembling trusses on a rigging table having a pair of clamp members on guides.
Figure 2:
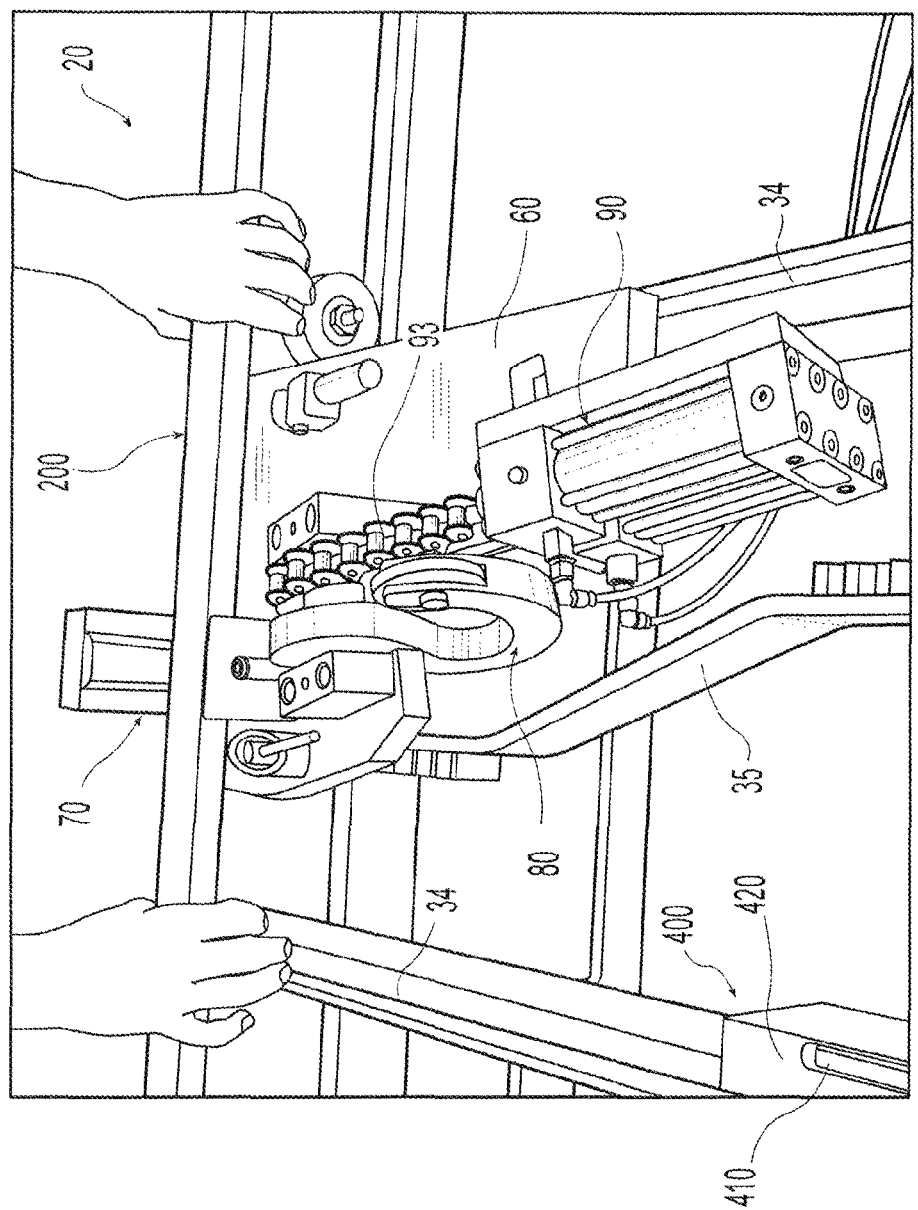
FIG. 2 is a partial perspective view of an alternate bunk assembly to the bunk assembly of FIG. 1 showing one clamp member with a chain guard removed and the second clamp member removed from the bunk assembly.
Figure 3:
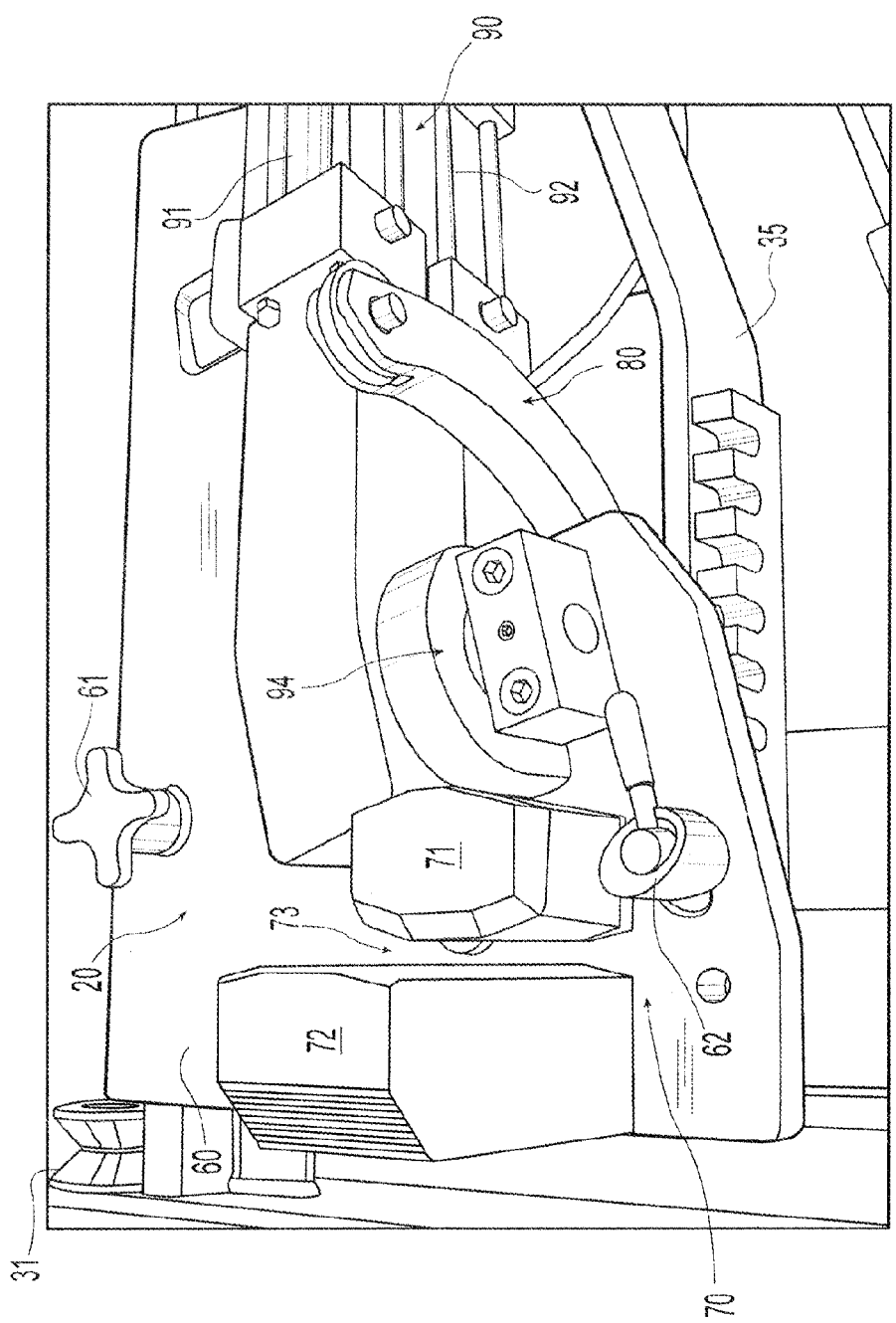
FIG. 3 is a second partial perspective view of the clamp member of the alternate bunk assembly shown in FIG. 2.
Figure 4:
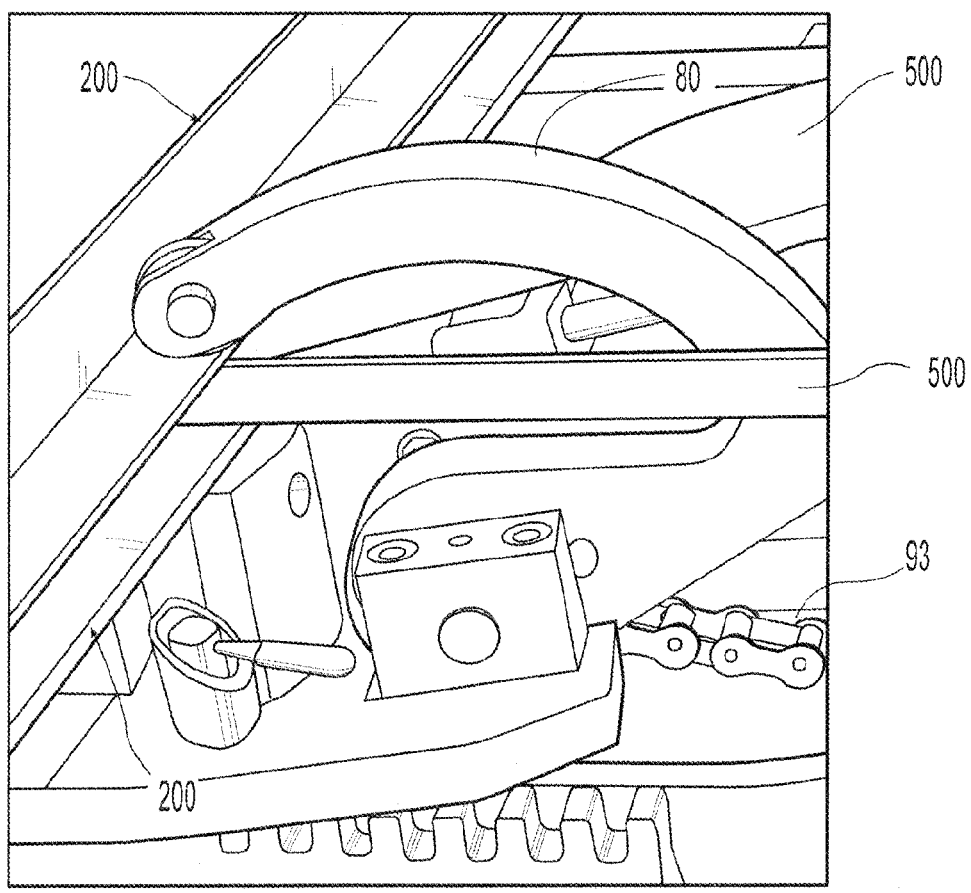
FIG. 4 is a partial perspective view of the clamp arm of FIG. 3 being in a securing position to secure a web between two chord portions during assembly of a truss.

FIGS. 1-11 illustrate various aspects of bunk assemblies 10 and 800 used as part of a rigging table in assembling trusses, in accordance with an embodiment of the present invention. FIG. 1 illustrates an exemplary embodiment of a bunk assembly 10 having a pair of automated clamp members 20 and used in assembling trusses on a rigging table. FIG. 2 illustrates a first view of an exemplary embodiment of one automated clamp member 20 of the bunk assembly 10 of FIG. 1. FIG. 3 illustrates a second view of an exemplary embodiment of one automated clamp member 20 of the bunk assembly 10 of FIG. 1. FIG. 4 illustrates an exemplary embodiment of a clamp arm 80 of one clamp member 20 of the bunk assembly 10 of FIG. 1 being in a securing position to secure webs 500 between two chord portions 200 during assembly of a truss. Two chord portions 200 may be used to make a single chord.

At least two bunk assemblies 10 may be used in a rigging table to secure and establish lateral and longitudinal spatial relationships between chord portions 200 and webs 500 of a truss to be assembled. The bunk assembly 10 includes a frame 30 having an extent in a generally lateral direction 40 relative to a base and an extent in a generally longitudinal direction 50 relative to the base. The frame 30 includes an outer frame portion 37 and an inner frame portion 33.

The bunk assembly 10 also includes a pair of guides 60 slidably positioned on the frame 30 to move generally transverse to the longitudinal axis of the base, or transverse to the longitudinal direction 50, toward and away from each other (i.e., generally in the lateral direction 40). The guides 60 are capable of being fastened in position on the frame 30 to accommodate assembly of different sized trusses. Each guide 60 is capable of being indexed along the frame 30 in predetermined increments adapted to assembly of different sized trusses of predetermined sizes, and fastened to the frame 30 to facilitate assembly of a truss. Furthermore, each guide 60 may be capable of being slidable along the frame and fastened in position between index positions to facilitate assembly of different size trusses.

The automated clamp members 20 may each be positioned relative to and moveable with one of the guides 60 on the frame 30 to accommodate assembly of different sized trusses. Each automated clamp member 20 is capable of securing an intersection of at least one chord portion 200 and one or more webs 500 to facilitate assembly of a truss. Furthermore, each automated clamp member 20 includes a stop portion 70 capable of positioning at least one chord portion 200 and one or more webs 500 during assembly of a truss. As shown in FIG. 3, each stop portion 70 includes an inner block 71 and an outer block 72 forming a nesting portion 73 there between, enabling a chord portion 200 to be positioned within the nesting portion 73.

As shown in FIGS. 2-4, each automated clamp member 20 includes a clamp arm 80 having an operative position capable of securing at least one chord portion 200 and one or more webs 500 in relation to the stop portion 70 for assembly of a truss, and retracting after the truss is assembled. Each automated clamp member 20 also includes an actuator 90 capable of moving the clamp arm 80 to secure at least one chord portion 200 and one or more webs 500 during assembly of a truss, and retracting the clamp arm 80 after the truss is assembled.

Figure 5A:
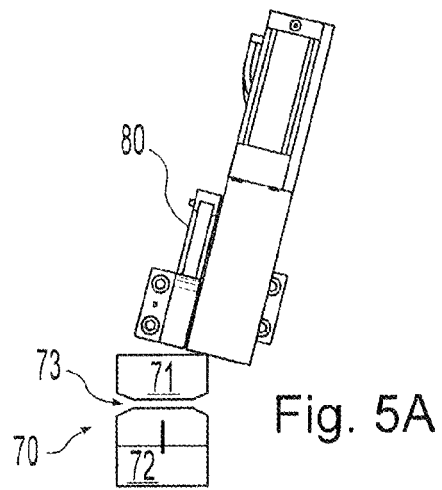
FIG. 5A is a partial plan view of a clamp member of the bunk assembly of FIG. 1.
Figure 5B:
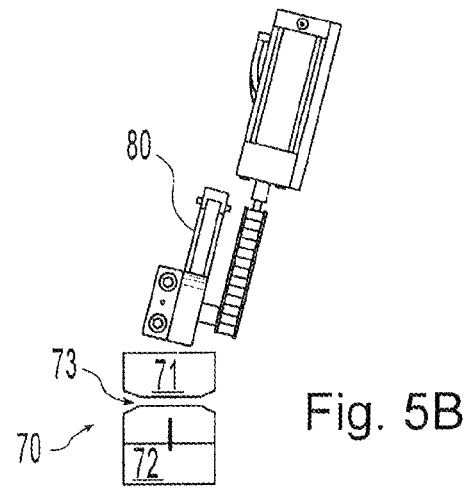
FIG. 5B is a view of the clamp member of FIG. 5A with the chain guard removed.
Figure 6A:
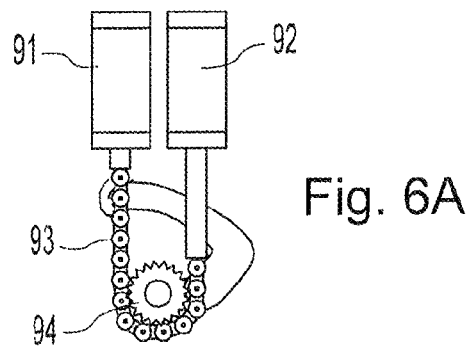
FIG. 6A is a side view of the clamp member of FIG. 5B in a retracted position.
Figure 6B:
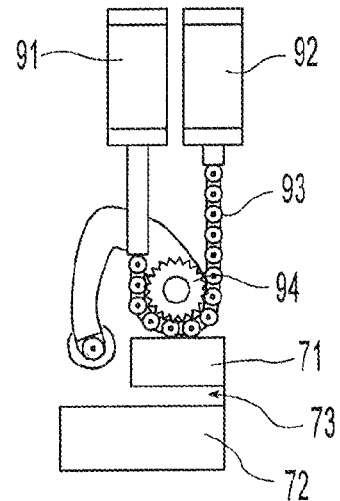
FIG. 6B is a side view of the clamp member of FIG. 5B in a securing position.

Each actuator 90 may include two actuating cylinders 91 and 92 capable of being extended and retracted, and a chain 93 connected between the two actuating cylinders 91 and 92 about a sprocket 94. The clamp arm 80 is driven by the sprocket 94 to move between the securing and the retracting positions, as shown in FIGS. 6A and 6B. The chain and sprocket may be covered by a chain guard. FIGS. 5B, 6A, and 6B show the assembly with the chain guard removed. Each actuator 90 may include a servo mechanism, a hydraulic mechanism, or a pneumatic mechanism that is capable of driving the clamp arm 80 between the securing and the retracting positions. As an alternative, each actuator 90 may include a rack and pinion capable of driving the clamp arm 80 between the securing and retracting positions.

A bunk assembly 10 may include at least one release member 100 capable of disengaging an assembled truss from the clamp members 20. The release members 100 may be attached to the frame 30 of the bunk assembly 10 and are capable of being actuated upward to lift an assembled truss out of and above the clamp members 20. Some bunk assemblies 10 may not have a release member 100. The number of bunk assemblies 10 on the rigging table 10 having at least one release member 100 may be determined by the size and weight of the assembled truss and the lifting capacity of each release member.

A bunk assembly 10 may include a roller 110 capable of allowing an assembled truss to move generally longitudinally along the rigging table 10. The roller 110 is attached to the frame 30 of the bunk assembly and is capable of being actuated upward such that an assembled truss rolling along the roller 110 may clear the clamp members 20. Typically, a bunk assembly 10 will have a roller 110 and at least one release member 100. Certain other specialized bunk assemblies such as bunk assembly 800 may not include a roller 110 or release members 100. Instead, certain other specialized bunk assemblies 800 may include a tilt arm mechanism 810 as shown and described later herein with respect to FIGS. 9 and 10.

Figure 7:
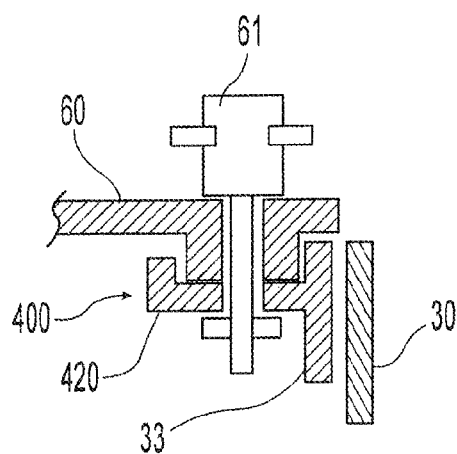
FIG. 7 is a partial section view through the bunk assembly of FIG. 1 through the section marked 7-7 showing a friction lock in a loosened position.

FIG. 2 illustrates an exemplary embodiment of a track 400 including a friction lock slot 410 and a track recess 420 as part of the inner frame portion 33 of the frame 30. As shown in FIG. 7, a corresponding runner, such as a protrusion or other feature, along the bottom of the guide 60 is positioned within the track recess 420 enabling the guide to move along the track in the lateral direction 40. By moving the guides 60 along the tracks 400, the clamp members 20 may be moved closer to each other or further away from each other to establish a lateral extent of a truss to be assembled. A friction lock 61 extending through the friction lock slot 410 may be used to secure the guide 60 in a desired position. As an example, the friction lock 61 may include a nut and bolt assembly such that the friction lock 61 may be tightened or loosened within the friction lock slot 410. The runner along the bottom of the guide 60 is positioned within the track recess 420 and serves, along with the friction lock 61 through the friction lock slot 410, to hold the guide 60 in place with respect to the frame 30. The guide 60 rests on the top surfaces of the inner frame portion 33 of the frame 30, including side rails 34 of the inner frame portion 33 and a central index rail 35 of the inner frame portion 33 as shown in FIGS. 1 through 4.

The central index rail 35 may include a plurality of indexing recesses, or teeth, capable of laterally positioning the guide 60 along the frame. The teeth of the central index rail 35 are spaced in predetermined increments, such as for example, one inch increments, or two centimeter increments, or other spaced increments as desired. A pop-lock 62, passing through or adjacent the guide 60, may be used to index the guide 60 to the teeth of the central index rail 35. The guide 60 may be moved laterally along the frame 30 and track 400 when the pop-lock 62 is released and the friction lock 61 is loosened. When placed in a desired lateral position along the index rail 35, the pop-lock 62 may be locked between the teeth of the index rail 35 and the friction lock 61 may be tightened to securely hold the guide 60 in place. Alternatively, the guide 60 may be secured between two teeth positions by tightening the friction lock 61 in the desired position with the pop-lock 62 remaining released.

Figure 8:
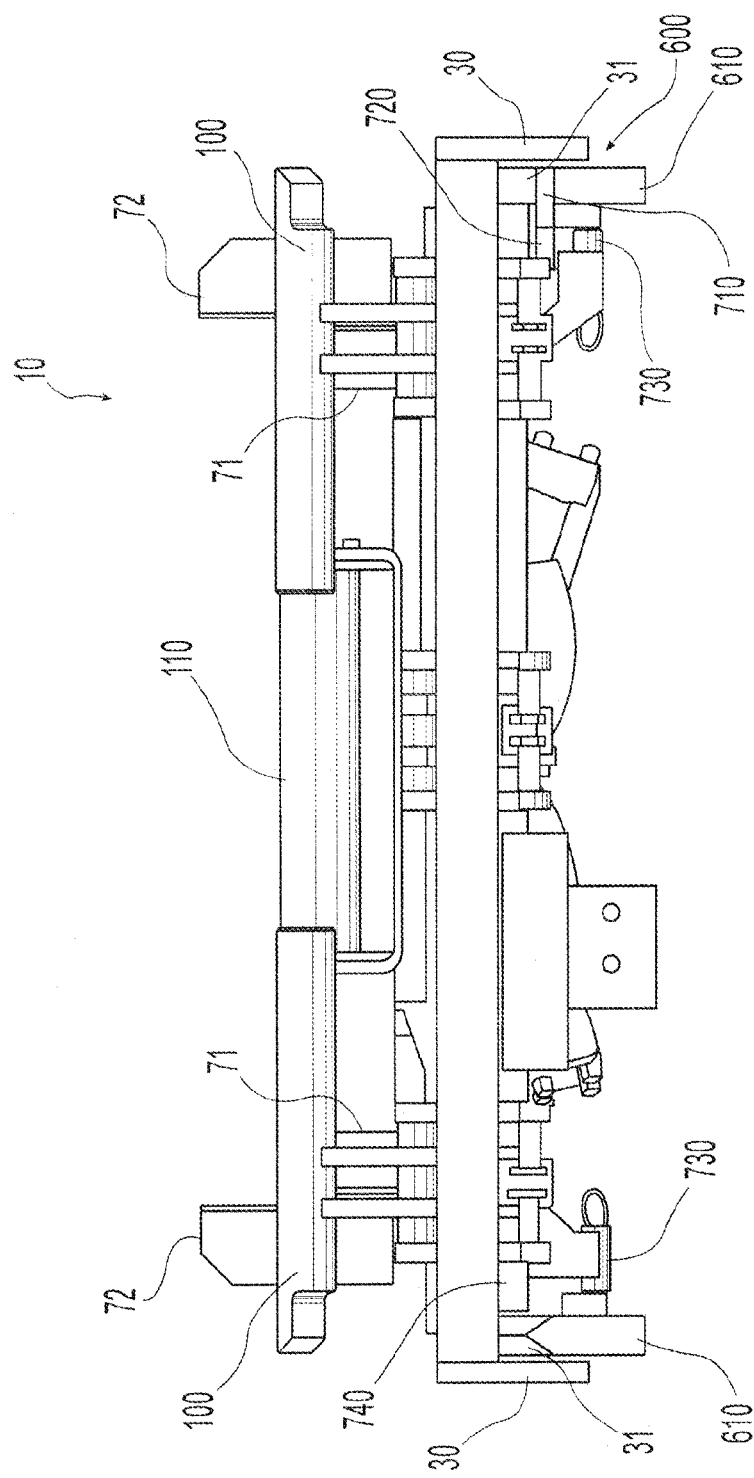
FIG. 8 is an end view of the bunk assembly of FIG. 1 positioned on a base of a rigging table.

As shown in FIG. 8, the bunk assembly 10 of FIG. 1 may be positioned on a rigging table base 600. The base 600 may include two substantially parallel rails 610 extending along the generally longitudinal direction 50 and capable of supporting at least two bunk assemblies 10 on a plurality of guide wheels 31 attached to the frames 30 of the bunk assemblies. The guide wheels 31 allow the bunk assemblies 10 to move on the rails 610 and be positioned or spaced longitudinally with respect to each other to accommodate assembly of different sized trusses. The wheels 31 along one rail 610 may be configured with a v-groove or other shape adapted to engage a corresponding shape on the rail 610 as shown in FIGS. 1 and 8. The v-groove or other shape guide wheel 31 enables the wheel to remain aligned with the rail 610. When the wheels 31 along one side of the frame are adapted to engage a corresponding shape on the rail 610, the wheels 31 on the other side of the frame may be capable of accommodating variations in the distance between the rails 610 caused by normal manufacturing tolerances, wear, environment, damage, or other dimensional differences, such as by wheels having a smooth circumference not engaging the rail.

The bunk assemblies 10 may be positioned with respect to each other along the rails 610 to provide desired longitudinal distance or spacing between clamp members 20 of adjacent bunk assemblies. The minimum longitudinal distance between clamp members 20 of a plurality of bunk assemblies may correspond to the width of the frame 30. When two adjacent bunk assemblies 10 are butted against each other (bunk frames touching) in the longitudinal direction 50, the distance from the clamp member of one bunk assembly to the corresponding clamp member of the adjacent bunk assembly may be about the width of the frame 30, which in the configuration of FIG. 1 may be about thirty inches (about 0.75 meters). Additionally, adjacent bunk assemblies 10 may be spaced apart as desired during operation of the rigging table. Typically, the distance between corresponding clamp members 20 from one bunk assembly to the next is determined based on the structural design of the truss to be assembled, and typically is less than about six feet (about 1.8 meters).

The bunk assemblies 10 may be capable of being slidable along the rails 610 and fastened in position to facilitate assembly of different size trusses. Further, the bunk assemblies may be capable of being indexed along the base in predetermined increments to facilitate assembly of desired trusses. The base 600 may include an indexing guide having a plurality of indexing recesses, or teeth, capable of longitudinally positioning the bunk assemblies along the base. An indexing guide may be adjacent one or both of the rails 610, and may be integral with each rail. The indexing teeth may be spaced in predetermined increments, such as for example, one inch increments (about 2.5 centimeters), or two centimeter increments (about 0.8 inch), or other spaced increments as desired. As shown in FIG. 8, spring-loaded pop-pins 730 may be attached to the frame 30 at each lateral extent such that the pop-pins 730 may engage the indexing guide of the base 600 in order to locate a bunk assembly 10 longitudinally along the base 600. The pop-pins 730 at each lateral extent of the bunk assembly 10 may have release cables connected together such that both pop-pins may be disengaged together by actuating the connected release cable.

The inner portion 33 of the frame 30 is capable of being positioned along the lateral direction 40 within the outer portion 37 of the frame 30. As best shown in FIG. 1, by loosening at least one friction lock 32, the inner frame portion 33 is slidable within the outer frame portion 37 from one lateral extent to the other. The inner frame portion is laterally positionable within the outer frame portion so that the inner frame portion 33 and clamp members 20 along the base 600 can be positioned to provide a desired camber along the length of the assembled truss.

FIG. 8 illustrates a view of the bunk assembly 10 of FIG. 1 positioned on a base 600 of a rigging table. To assist in positioning the plurality of clamp members to provide the desired camber, the base 600 may include longitudinally extending camber rails, or camber stops 710, adjacent one or both lateral extents of the base 600 bounding the lateral movement of the inner frame portion 33. A guide portion 720 of the inner frame portion 33 is capable of selectively engaging the camber stops such that the inner frame portion 33 may be positioned relative to or abutting the camber stop 710 adjacent one lateral extent, or moved in the lateral direction 40 toward a camber stop adjacent the opposite lateral extent. When a camber stop is not provided along a lateral extent, the movement of the inner frame portion 33 may be bounded by the outer frame portion 37 or the rail 610, or the base 600, any of which may be adapted to provide zero camber in the assembled truss. Alternately, to provide zero camber in the assembled truss, a straight camber stop may be provided to align the inner frame portions with zero camber. The camber stops 710 may be positioned adjacent to the rail 610, or may be integral to the rail.

The camber rails, or camber stops 710, may have an arcuate longitudinal face along the base 600 such that a plurality of inner frame portions 33 may be positioned relative to the arcuate face along the base providing a camber corresponding to the arcuate radius. The camber stop may be provided with a radius of curvature determined by an industry standard, a structural design requirement, or other radius. While the camber stops may have any desired radius of curvature, it is contemplated that the rigging table be provided with a radius of curvature that is typically assembled on the table, or a "standard camber." In one example, the standard camber may be a radius of curvature of about 3,600 feet (about 1097.3 meters). In the configuration of FIG. 8, the outer portion 37 of frame 30 provides the inner frame stop adjacent one lateral extent, and a camber stop 710 is provided adjacent the opposite lateral extent. In this embodiment, the plurality of bunk assemblies may be positioned relative to or against the camber stop 710 during assembly of a truss to provide assembled trusses having a slight curve, or camber corresponding to the arcuate radius of the camber stop.

The friction lock 32 may include a nut and bolt assembly passing through the outer portion 37 and inner portion 33 of the frame 30 capable of securing the inner frame portion within the outer frame portion 37. The friction lock 32 may be used to secure the inner portion 33 of the frame 30 against either lateral extent bounded by the camber stop, the rail 610, or the outer frame portion 37, to provide the desired camber. Alternately, the friction lock 32 may be used to secure the inner frame portion 33 positioned between the stops at the lateral extents to provide, for example, a custom camber. When assembling a truss having a defined camber, a center of a truss to be assembled may be aligned with the center of the camber rail 710 to be able to assemble trusses of different lengths having the same camber (i.e,. radius of curvature). Furthermore, the camber rail 710 may be changed out with another camber rail to accommodate the assembly of trusses having other radii of curvature.

Figure 9:
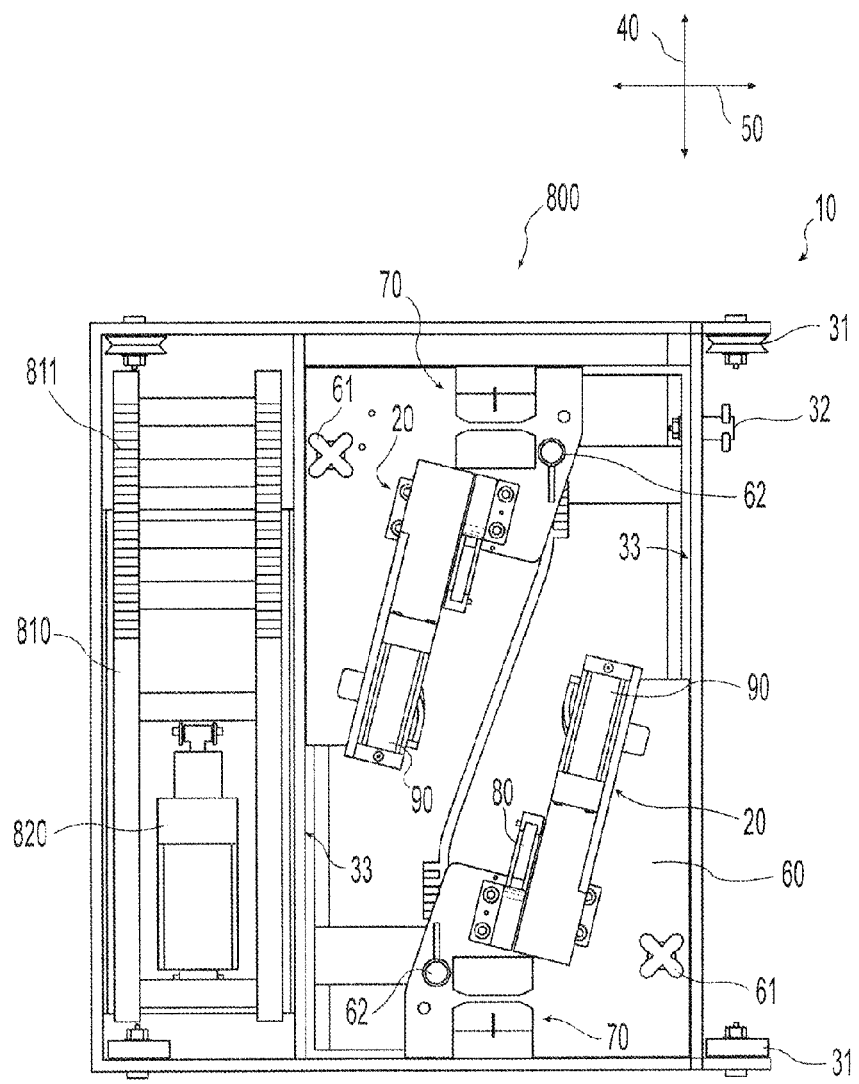
FIG. 9 is a diagrammatical plan view of a second alternate bunk assembly having a tilt arm for lifting a tack-welded truss upward and onto rollers of other standard bunk assemblies.
Figure 10:
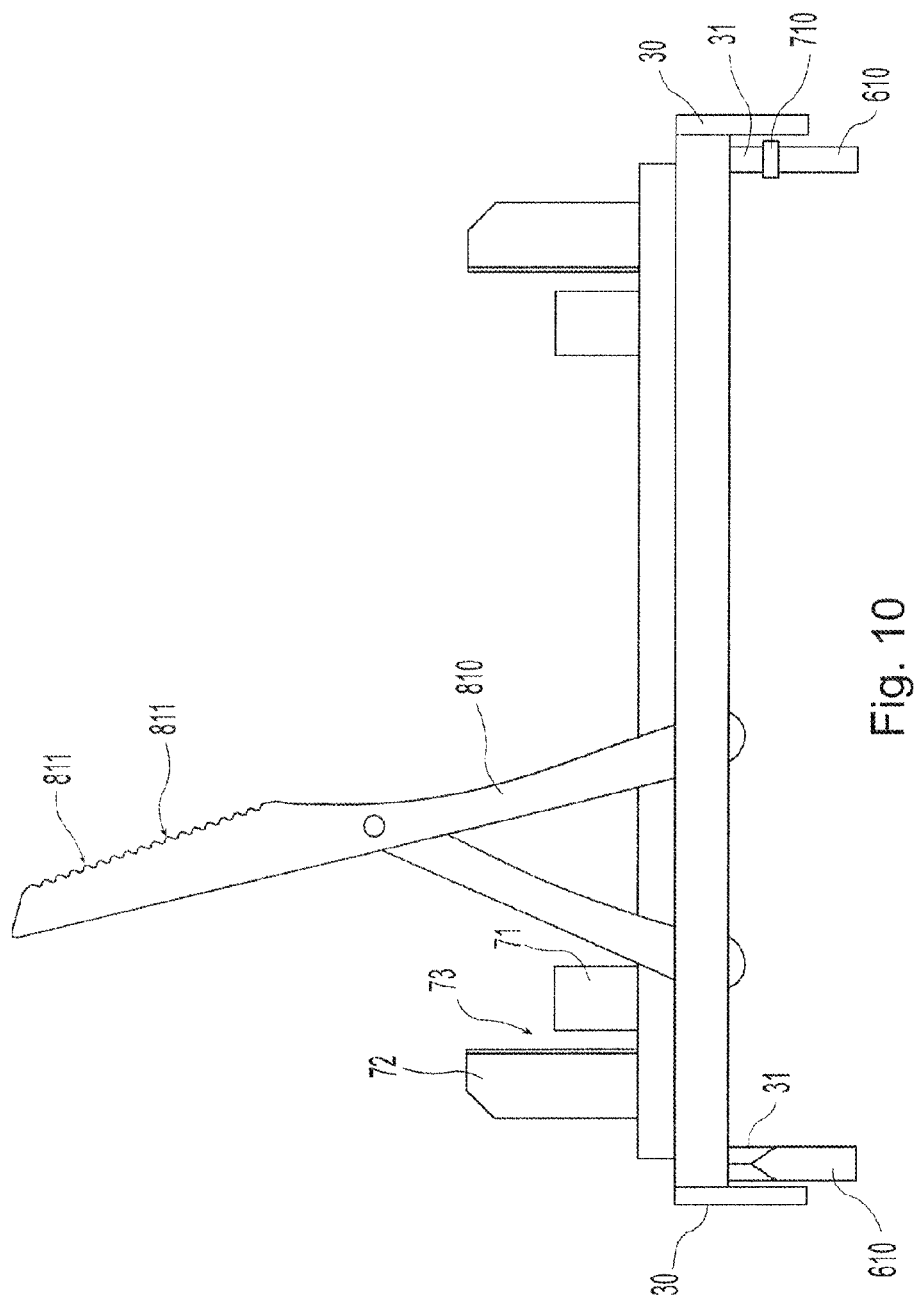
FIG. 10 is an end view of the bunk assembly of FIG. 9 with a raised tilt arm.
Figure 11:
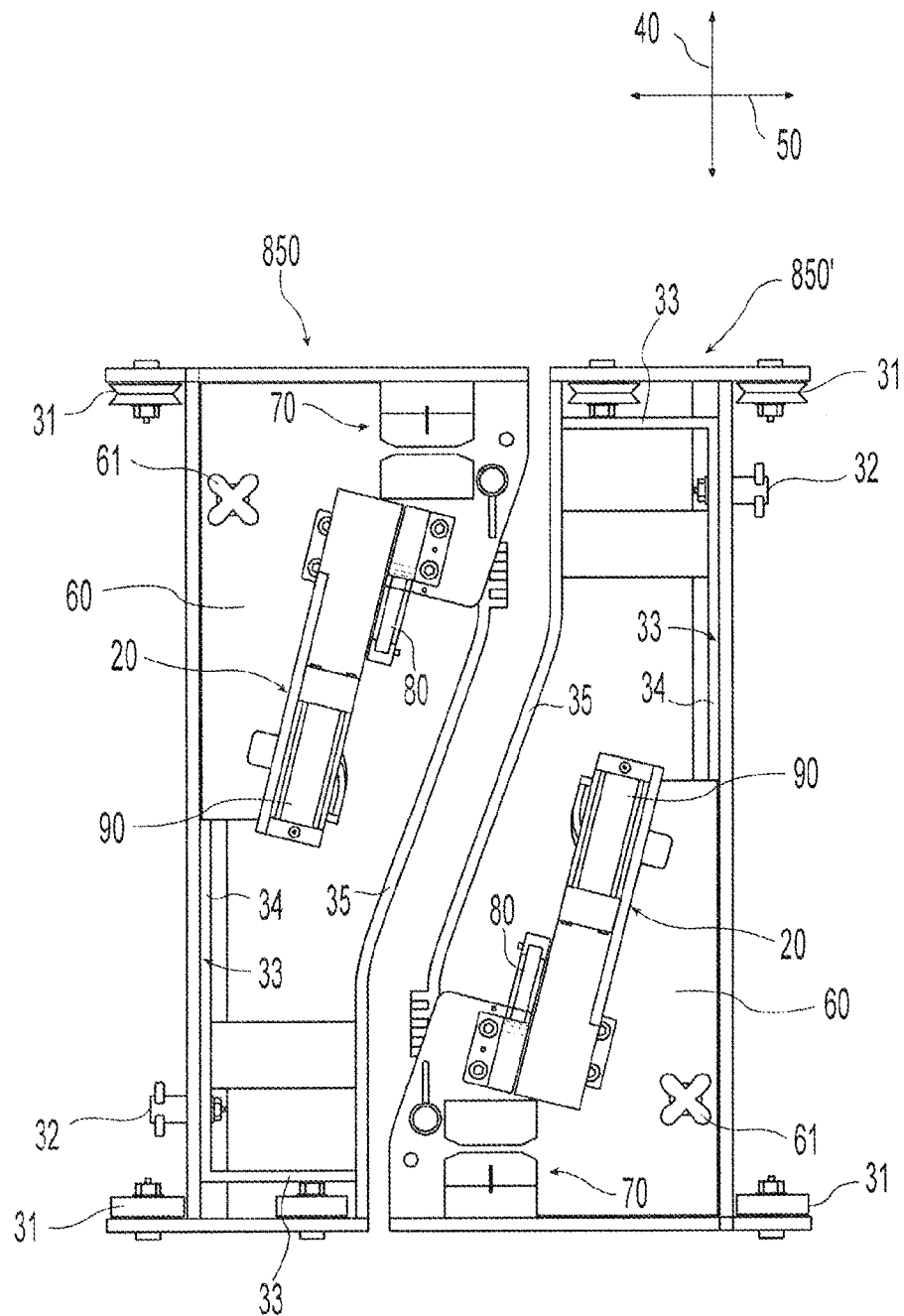
FIG. 11 is a diagrammatical plan view showing two of a third alternate bunk assembly each having one clamp member on a guide.

FIG. 9 illustrates an exemplary embodiment of a specialized bunk assembly 800 having a tilt arm 810 for tilting a tack-welded truss upward and onto the rollers 110 of standard bunk assemblies 10. FIG. 10 illustrates an exemplary embodiment of the tilt arm 810 of FIG. 9 in a lifted position. Several specialized bunk assemblies 800 and tilt arms 810 may be positioned along the length of the base 600 of the rigging table. After a truss is assembled (e.g., tack-welded) on the rigging table, an operator may release all the clamp arms 80 via a single point release. Alternately, operators may release each clamp arm 80 at each bunk assembly 10. Then, the release members 100 within the standardized bunk assemblies 10 are actuated to lift up the assembled truss to clear the upper portion of the bunk assemblies 10, and the rollers 110 are actuated to lift upward. The tilting arms 810 are then actuated to move the assembled truss onto the rollers 110. The truss may be moved onto the rollers in a generally vertical orientation. The tilting arms 810 may be moved by actuator 820, which may be actuated hydraulically, pneumatically, or by other actuators. The riggers at the rigging table may assist in guiding the assembled truss onto the rollers 110 and then move the truss along the table on the rollers. Once an assembled truss is removed from the rigging table, the operators (riggers) may provide next chord portions 200 and webs 500 to the bunk assemblies for assembly of the next truss.

The tilt arm 810 may be attached to the frame 30 of the bunk assembly 800 and is capable of being actuated such that a bottom portion of the tilt arm 810 slides from one lateral extent of the bunk assembly 800 toward the opposite lateral extent of the bunk assembly 800 as the tilt arm 810 operates. This enables the tilt arms 810 to lift an assembled truss to a generally vertical position such that the assembled truss rests on the rollers 110. The tilt arms 810 may include serrated edges 811 to help catch the assembled truss as the assembled truss is tilted upward. The assembled truss may then be rolled, in the longitudinal direction 50, off of the rigging table by the rigging table operators.

Other specialized bunk assemblies may be provided. Such other specialized bunk assemblies may include end bunk assemblies that are customized to assemble a certain type of end on each side of a truss. Such end bunk assemblies may not have, for example, a roller 110 or a tilt arm 810. Furthermore, such end bunk assemblies may include only one clamp member 20, such as an end bunk assembly 850, 850' shown in FIG. 11, and may be narrower (in the longitudinal direction 50) than the bunk assembly 10 of FIG. 1. Other variations of end bunk assemblies are possible as well, depending on the design of the end of the desired truss.

The rigging table may include a material handling apparatus to selectively position chord portions between the operators, or riggers, and the rigging table to reduce the distance and motion needed to move the chord portion to the clamp members 20. The material handling apparatus may be capable of moving chord portions, selected for a given truss to be assembled, into position under or below the bunk assemblies adjacent the lateral extent of the frames 30, and having automated arms operative to engage a chord portion positioned under or below the bunk assemblies and move the chord portion to enable positioning of the chord portion relative to the frame 30 and guides 60 for assembly of a truss.

Figure 12:
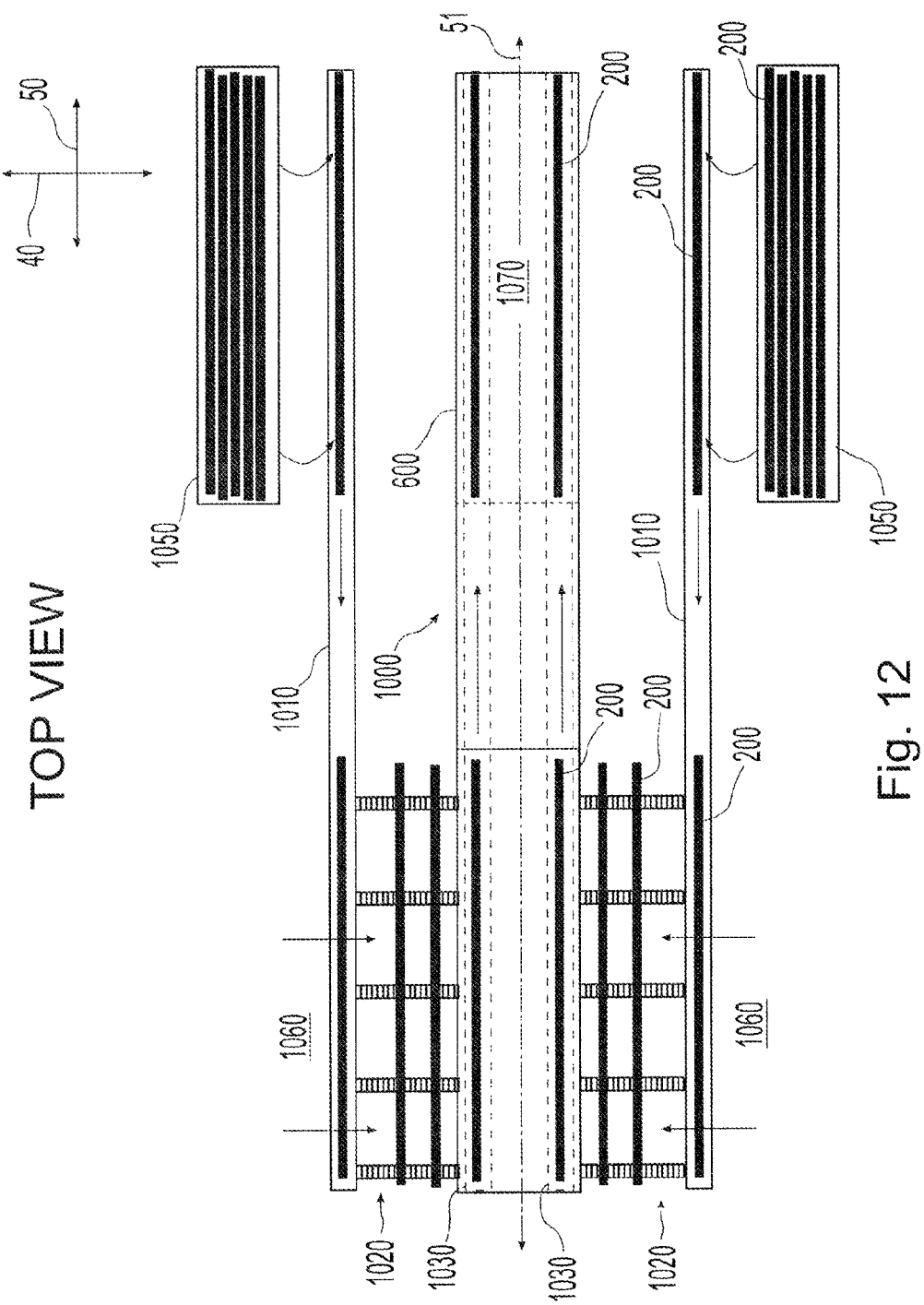
FIG. 12 is a diagrammatical plan view of a rigging table and associated chord portion conveyors for use in assembling trusses.

FIG. 12 is a schematic diagram of a top view of an exemplary embodiment of a rigging table 1000, having a generally longitudinal axis 51 in a generally longitudinal direction 50, and associated chord portion conveyors 1010, 1020 and 1030 for use in assembling trusses. The various bunk assemblies rest on top of the rails of the base 600 of the rigging table 1000 as described previously herein.

As shown in FIG. 12, chord portions 200 are provided on a material rack 1050. A chord portion 200 may be removed from the material rack 1050, by operators or by a removal device, and onto the first longitudinal conveyor 1010 which is offset from the base 600 of the rigging table 1000. The chord portion 200 travels down the first longitudinal conveyor 1010 in the longitudinal direction 50 toward a kickoff position 1060 where the chord portion 200 is kicked off of the first longitudinal conveyor 1010 and onto a lateral conveyor 1020. In this manner, chord portions 200 are queued along the lateral conveyor 1020. When a chord portion 200 is needed, the chord portion 200 transfers from the lateral conveyor 1020 to a second longitudinal conveyor 1030. As shown in FIG. 12, the second longitudinal conveyor 1030 may be positioned adjacent the end of the lateral conveyor 1020, and the chord portions may transfer from the lateral conveyor 1020 to the second longitudinal conveyor 1030 by dropping from the lateral conveyor onto the second longitudinal conveyor. Alternately, a kick-off arm may be used to kick the chord portion 200 from the lateral conveyor 1020 to the second longitudinal conveyor 1030. The first longitudinal conveyor 1010 may be positioned at a higher elevation than the second longitudinal conveyor 1030. After one chord portion 200 advances along the second longitudinal conveyor 1030 away from the kickoff position 1060, another chord portion may be transferred from the lateral conveyor 1020 to the second longitudinal conveyor so that chord portions 200 are queued along the second longitudinal conveyor.

The chord portion 200 travels along the second longitudinal conveyor 1030 in the longitudinal direction 50 and stops beneath the rigging table 1000 in the truss assembly area 1070 to be used in the assembly of a truss on the rigging table 1000. The material handling apparatus and the process of providing chord portions 200 from a material rack 1050 to the truss assembly area 1070 beneath the rigging table 1000 on the second longitudinal conveyor 1030 is duplicated on the opposite side of the rigging table 1000. In this manner, chord portions 200 are automatically fed to the truss assembly area 1070 beneath the rigging table 1000 on both sides of the rigging table 1000 as shown in FIG. 12.

Figure 13:
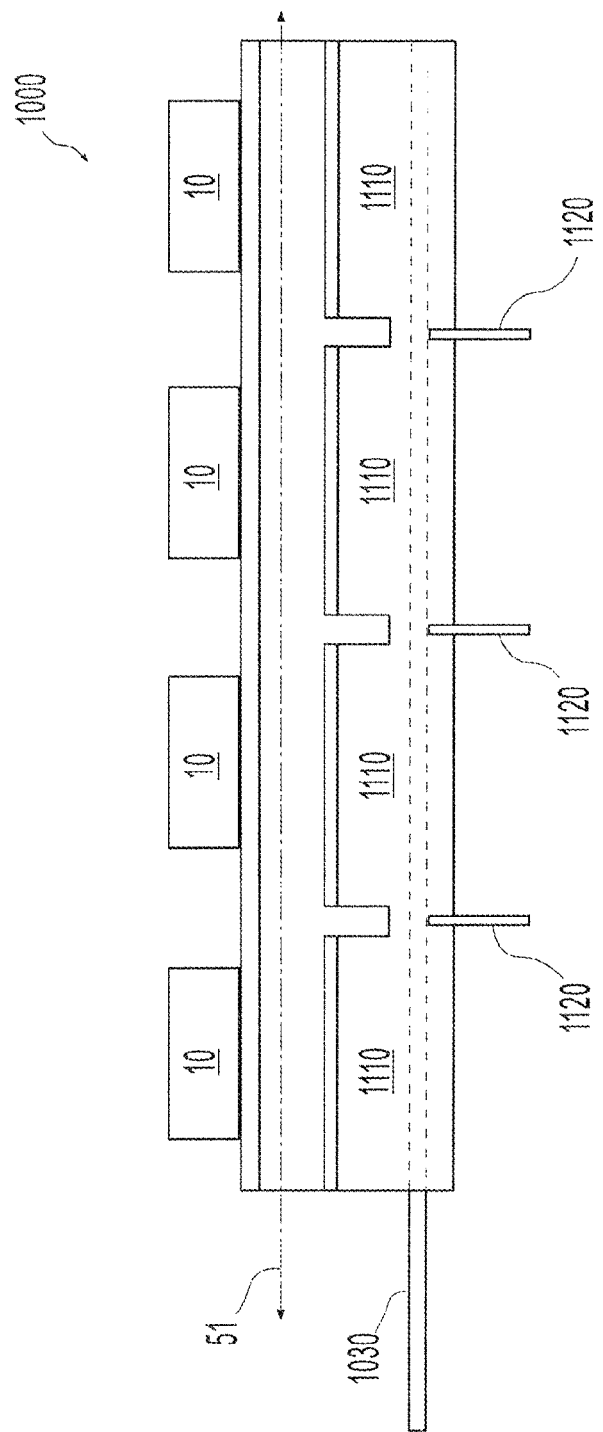
FIG. 13 is a diagrammatical side view of a portion of a rigging table illustrating the relationship between a chord portion conveyor, guard panel, and chord portion lifting arms.

FIG. 13 is a schematic diagram of a side view of an exemplary embodiment of a portion of the rigging table 1000 of FIG. 12 illustrating the relationship between the second longitudinal conveyor 1030, a worker guard panel 1110, and automated chord portion lifting arms 1120. The worker guard panels 1110 protect the operators, or riggers, on either side of the rigging table 1000 from the mechanism of the conveyor 1030. The worker guard panels 1110 are capable of moving to enable the chord portion to be moved from beneath the bunk assemblies to above the bunk assemblies for positioning for assembly of a truss, and moving back to facilitate movement of workers adjacent the lateral extent of the base. A plurality of automated lifting arms 1120 may be positioned along the rigging table and are capable of automatically extending to lift a chord portion 200 off of the conveyor 1030 upward toward the base 600 of the rigging table 1000 when the guard panels 1110 are in an open position. The extended lifting arms 1120 may position the chord portions between the riggers and the rigging table enabling the riggers to lift and move the chord portions onto the frame 30 and guides 60 for assembly of a truss. The automated lifting arms 1120 present a chord member when the guard panels 1110 are in the open position. The guard panels may be segmented between lifting arms 1120, or include apertures at each lifting arm, such that the guard panels may return to a closed position with the lifting arms 1120 in the extended position.

Figure 14A:
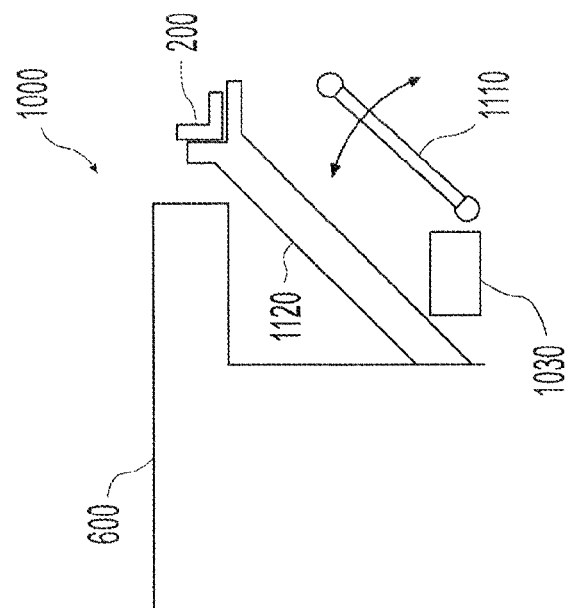
FIG. 14A is a schematic diagram of an end view of a portion of the rigging table of FIG. 13 showing a chord portion resting on the chord portion conveyor with the guard panel in a closed position.
Figure 14B:
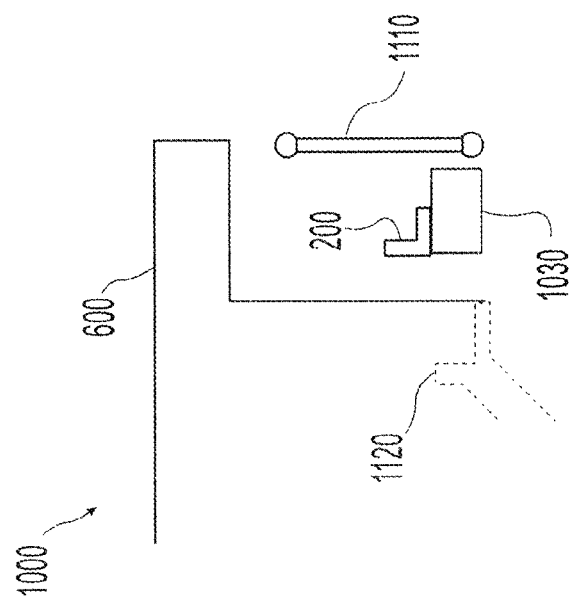
FIG. 14B is a schematic diagram of an end view of a portion of the rigging table of FIG. 13 showing a chord portion lifted off of a chord portion conveyor by automated lifting arms with the guard panels in an open position.

FIG. 14A is a schematic diagram of an end view of a portion of the rigging table 1000 of FIG. 13 showing a chord portion 200 resting on the chord portion conveyor 1030 with the worker guard panel 1110 in the closed position and the automated lifting arms 1120 in a retracted position. FIG. 14B is a schematic diagram of an end view of a portion of the rigging table 1000 of FIG. 13 showing the chord portion 200 lifted off of the chord portion conveyor 1030 by the automated lifting arms 1120 with the worker guard panel 1110 in the open position.

The top portion of each lifting arm 1120 may be L-shaped in order to snag or catch the chord portion 200 in the L-shaped top portion and lift the chord portion 200 off of the conveyor 1030. When extended, the arms 1120 may be about the height of the bunk assembly. Once the arms 1120 are extended with a chord portion 200 in the L-shaped top portion, the guard panels 1110 may be closed (retracted), leaving the arms 1120 extended through the apertures in the panel, so that the operators can approach the chord portion 200, grab the chord portion 200 off the arms 1120, and place the chord portion 200 onto the bunk assemblies. There may be at least one operator positioned on each side of the bunk assembly. The arms 1120 then retract after the chord portion 200 is lifted from the arms 1120 by the operators. In response to the arms 1120 retracting, the second longitudinal conveyor 1030 may present another chord portion 200 under the base 600 of the rigging table 1000 in preparation for presenting the next chord portion. This process occurs on both sides of the rigging table 1000.

Figure 15:
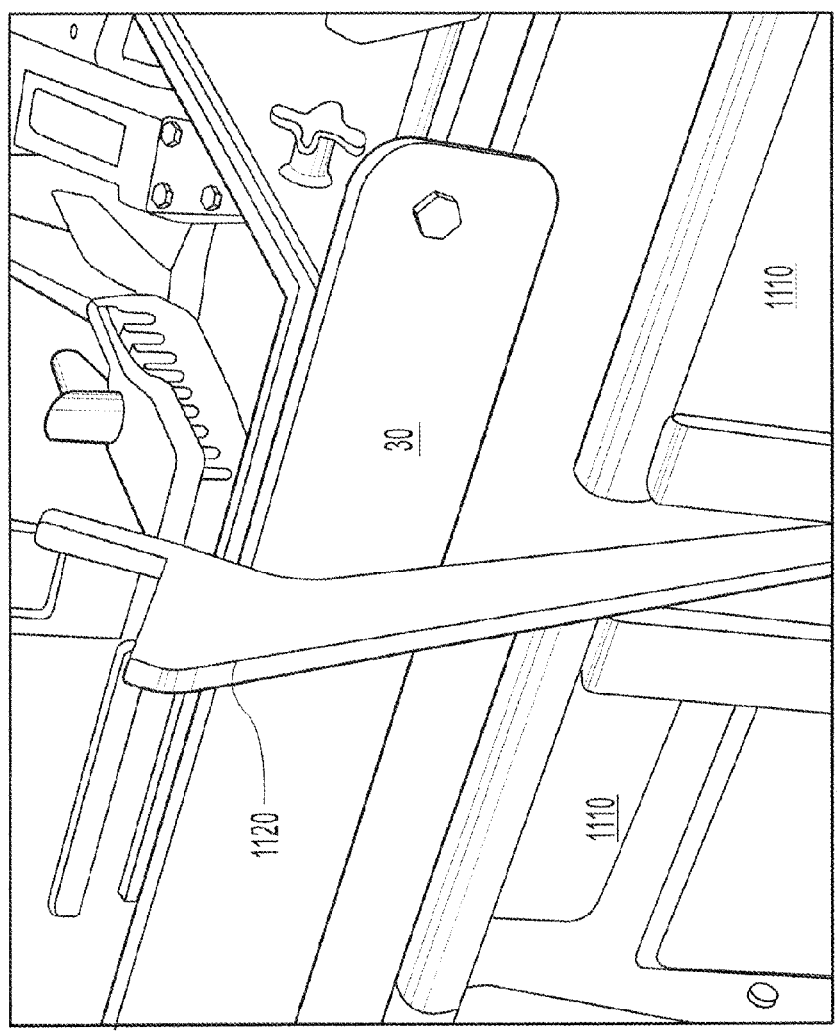
FIG. 15 is a partial perspective view of a chord portion lifting arm in an extended position for lifting a chord portion upward and off of a chord portion conveyor with the guard panel in the closed position.

When a chord portion 200 is lifted upward off of the conveyor 1030 by the lifting arms 1120, the operators may lift the chord portion 200 and place the chord portion 200 onto the nesting portion 73 of the bunk assemblies 10 and 800, for example. FIG. 15 illustrates an exemplary embodiment of an automated lifting arm 1120 in an extended position for lifting a chord portion 200 upward off of a chord portion conveyor 1030. FIG. 16 illustrates an exemplary embodiment of an automated lifting arm 1120 in a retracted position before lifting a chord portion 200 from the chord portion conveyor 1030.

A controller is provided capable of receiving inputs from the riggers and activating the rigging table in a desired sequence. The controller may include a computer-based platform such as, for example, a personal computer (PC) or the controller may include a programmable logic controller (PLC), for example. The controller interfaces to the material handling apparatus and the rigging table such that the controller may activate/deactivate various actuators of the material handling apparatus and the rigging table in order to control the flow of material (i.e., chord portions) and in order to control various actuating features of the rigging table. The controller may include a user interface (e.g., a touch screen) enabling a lead operator to manually select various functions to initiate various control commands to the material handling apparatus and/or rigging table.

Sensors (not shown) may be provided to indicate the position of chord portions 200 in the material handling apparatus, for example, the presence of a chord portion 200 in the truss assembly area 1070, and capable of providing corresponding signals to the controller. Further, sensors may be provided to indicate the position of portions of the rigging table, for example, clamp arms 80, guard panels 1110, lifting arms 1120, and other portions of the rigging table and providing signals corresponding to the position to the controller. The controller may further be capable of receiving signals from the sensors and activating the rigging table in response to the sensor signals.

For example, during operation, after a truss is assembled on the rigging table 1000 (e.g., tack-welded), the assembled truss may be lifted and tilted upward to be rolled off of the rigging table 1000 as previously described herein, in response to commands from the controller. The actuation of the release members 100 lifting up the assembled truss may automatically signal the controller to actuate the transfer of a chord portion 200 from the lateral conveyor 1020 to the second longitudinal conveyor 1030 on both sides of the rigging table 1000. When it is time to present a next chord portion 200 to the operators, the controller may command the actuation of the guard panels 1110 such that the guard panels move into the open position to allow a chord portion to be extended. The guard panel 1110 may move downward like a hinged door, may move laterally, translate downwardly, or otherwise move into the open position. The lifting arm apertures in the guard panels 1110 may have a cut-out or open area that begins below the conveyor 1030 and extends upward such that the lifting arms 1120 may pass through when the guard panels 1110 are opened, and the lifting arms may remain extended when the guard panels are closed.

When using the rigging table 1000 to assemble a truss, operators place bottom chord portions 200 onto the bunk assemblies and set webs 500 across the bottom chord portions. The webs may be tack-welded to the bottom chord portions. Then, a top chord portion may be lifted up and placed by the operators on top of the webs. Each operator may activate an automated clamp member 20 to close the clamp arm 80 to secure the webs sandwiched between the top and bottom chord portions at each clamping position. The top chord portion may then be tack-welded to the webs. A lead operator may then activate a global release of all the clamp arms 80, via the controller, which retracts all of the clamp arms 80 an initiates lifting of the resultant assembled truss.

While certain embodiments have been described in the present application, it will be understood by those skilled in the art that various changes may be made and equivalents may be substituted without departing from the scope of the claimed invention. In addition, many modifications may be made to adapt a particular situation or material to the teachings of the claimed invention without departing from its scope. Therefore, it is intended that the claimed invention not be limited to the particular embodiments disclosed, but that the claimed invention will include all embodiments falling within the scope of the appended claims.

What is claimed is:

1. A rigging table for assembling trusses comprising:
    a base configured for operative coupling with the rigging table having a generally longitudinal axis and a generally lateral extent;
    at least two bunk assemblies, each bunk assembly comprising:
        a frame;
        a pair of guides operatively coupled to the frame;
        a pair of stop portions, each stop portion operatively coupled to one of the pair of guides, and configured to position a chord of a truss during assembly; and
        a pair of clamp members, each clamp member operatively coupled to one of the pair of the guides, and configured to secure the chord to one or more webs of the truss during assembly;
    wherein the frame of each of the at least two bunk assemblies is moveable along the longitudinal axis of the base relative to at least another bunk assembly; and
    wherein the pair of guides with the pair of stop portions and the pair of clamp members are slidably positioned on the frame to move generally transverse to the longitudinal axis of the base toward and away from each other and able to be fastened in position on the frame to accommodate assembly of different sized trusses.

2. The rigging table as claimed in claim 1, where each guide is capable of being indexed along the frame in predetermined increments adapted to assemble the different sized trusses, and fastened to the frame to facilitate assembly of the truss.

3. The rigging table as claimed in claim 1, where each guide is capable of alternatively being slidable along the frame and fastened in position to facilitate assembly of the different size trusses or being indexed along the frame in predetermined increments adapted to assemble the different sized trusses, and fastened to the frame to facilitate assembly of the truss.

4. The rigging table claimed in claim 1 where the at least two bunk assemblies have clamp members that are automated, each comprising:
    a clamp arm having an operative position capable of securing the chord and the one or more webs in relation to the stop portion for assembly of the truss, and retracting after the truss is assembled.

5. The rigging table as claimed in claim 4 where the at least two bunk assemblies having the clamp members each further comprise an actuator capable of moving the clamp arm to secure the chord and the one or more webs during assembly of the truss, and retracting the clamp arm after the truss is assembled.

6. The rigging table as claimed in claim 5 where each actuator comprises:
    two actuating cylinders capable of being extended and retracted; and
    a chain connected between the two actuating cylinders about a sprocket such that the clamp arm is driven by the sprocket to move between the securing and retracting positions.

7. The rigging table as claimed in claim 6 where each actuator comprises a mechanism selected from the group consisting of a servo mechanism, a hydraulic mechanism, and a pneumatic mechanism, and is capable of driving the clamp arm between the securing and retracting positions.

8. The rigging table as claimed in claim 5 where each actuator comprises a rack and pinion capable of driving the clamp arm between the securing and retracting positions.

9. The rigging table as claimed in claim 1 where each stop portion comprises a nesting portion capable of positioning a chord portion of the truss during assembly.

10. The rigging table as claimed in claim 9 where the nesting portion of each stop portion is formed by an inner block and an outer block enabling the chord portion to be positioned there between.

11. The rigging table as claimed in claim 1 further comprising at a least one release member capable of disengaging the truss from the clamp members after assembly.

12. The rigging table as claimed in claim 11 where a release member is attached to each frame of each bunk assembly.

13. The rigging table as claimed in claim 1 further comprising:
    rollers capable of allowing the truss to move generally longitudinally along the base after assembly; and
    at least one tilt arm capable of moving the truss onto the rollers after assembly.

14. The rigging table as claimed in claim 13 where at least one roller is attached to the frame of each bunk assembly.

15. The rigging table as claimed in claim 1 where the base has rails extending along the generally longitudinal axis and capable of supporting the at least two bunk assemblies on a plurality of guide wheels attached to the frames of the at least two bunk assemblies, and capable of allowing the at least two bunk assemblies to move on the rails and be positioned to accommodate assembly of the different size trusses.

16. The rigging table as claimed in claim 1 where the base further comprises stops adjacent the lateral extent of the base selectively engaging a portion of the frame of the bunk assemblies such that when the frames are positioned relative to the stops adjacent the lateral extent, a camber is provided in the assembled truss.

17. The rigging table as claimed in claim 16 where the stops include longitudinally extending camber rails having a longitudinal face adjacent the lateral extent of the base, the longitudinal face having a desired radius of curvature defining the camber.

18. The rigging table as claimed in claim 1 where the base further comprises stops adjacent each lateral extent of the base capable of selectively engaging a portion of the frame of the at least two bunk assemblies such that when the frames are positioned relative to the stops adjacent one lateral extent, a zero camber is provided in the truss assembled, and when the frames are positioned relative the stops adjacent the opposite lateral extent, a standard camber is provided in the truss assembled.

19. The rigging table as claimed in claim 1 further comprising:
conveyors capable of moving chord portions, selected for the truss for assembly, into position under the at least two bunk assemblies adjacent the lateral extent of the frames thereof; and
automated arms operative to engage at least one chord portion positioned under the bunk assemblies and move the at least one chord portion to enable positioning the at least one chord portion relative to the frame and the guides of the truss.

20. The rigging table as claimed in claim 1 further including an automated worker guard panel capable of moving to enable at least one chord portion to be moved from beneath the at least two bunk assemblies to above the at least two bunk assemblies for positioning for assembly of the truss, and moving back to facilitate movement of workers adjacent the lateral extent of the base.

21. A bunk assembly for a rigging table comprising:
a frame extending along a longitudinal extent and a lateral extent;
a pair of guides operatively coupled to the frame;
a pair of stop portions, each stop portion operatively coupled to one of the pair of guides, and configured to position a chord of a truss during assembly;
a pair of clamp members, each clamp member operatively coupled to one of the pair of guides, and configured to secure the chord to one or more webs of the truss during assembly;
wherein the frame is configured to move along a longitudinal axis of a rigging table relative to at least another bunk assembly; and
wherein at least one of the pair of guides is slidably positioned on the frame to move generally along the lateral extent toward and away from the other guide and able to be fastened in position on the frame to accommodate assembly of different size trusses.

22. The bunk assembly as claimed in claim 21 where the at least one guide is capable of being indexed along the frame in predetermined increments adapted to assemble the different sized trusses, and fastened to the frame to facilitate assembly of the truss.

23. The bunk assembly as claimed in claim 21 where the at least one guide is capable of alternatively being slidable along the frame and fastened in position to facilitate assembly of the different size trusses or being indexed along the frame in predetermined increments adapted to assemble the different sized trusses, and fastened to the frame to facilitate assembly of the truss.

24. The bunk assembly claimed in claim 21 where each clamp member is automated and comprises:
a clamp arm having an operative position capable of securing the chord and the one or more webs in relation to the stop portion for assembly of the truss, and retracting after the truss is assembled.

25. The bunk assembly as claimed in claim 24 where each clamp member further comprises an actuator capable of moving the clamp arm to secure the components during assembly of the truss and retracting the clamp arm after the truss is assembled.

26. The bunk assembly as claimed in claim 25 where each actuator comprises:
two actuating cylinders capable of being extended and retracted; and
a chain connected between the two actuating cylinders about a sprocket such that the clamp arm is driven by the sprocket to move between the securing and retracting positions.

27. The bunk assembly as claimed in claim 26 where each actuator comprises a mechanism selected from the group consisting of a servo mechanism, a hydraulic mechanism, and a pneumatic mechanism, and is capable of driving the clamp arm between the securing and retracting positions.

28. The bunk assembly as claimed in claim 26 where each actuator comprises a rack and pinion capable of driving the clamp arm between the securing and retracting positions.

29. The bunk assembly as claimed in claim 21 where each stop portion comprises a nesting portion capable of positioning a chord portion of the truss during assembly.

30. The bunk assembly as claimed in claim 29 where the nesting portion of each stop portion is formed by an inner block and an outer block enabling a chord portion to be positioned there between.

31. The bunk assembly as claimed in claim 21 further comprising at least one release member capable of disengaging the truss from the clamp members after assembly.

32. The bunk assembly as claimed in claim 31 where the at least one release member is attached to the frame of the bunk assembly.

33. The bunk assembly as claimed in claim 21 further comprising:
rollers capable of allowing the truss to move generally longitudinally along a base of the rigging table after assembly; and
at least one tilt arm capable of moving the truss onto the rollers after assembly.

34. The bunk assembly as claimed in claim 33 where at least one roller is attached to the frame of the bunk assembly.

35. The bunk assembly as claimed in claim 21 further comprising a plurality of guide wheels attached to the frame and capable of allowing the bunk assembly to move on rails of a base of the rigging table, and be positioned to accommodate assembly of the different sized trusses.

36. The bunk assembly as claimed in claim 21, further comprising stops for the guides on the lateral extent of the bunk assembly such that when the guides are positioned relative to the stops from one side, a zero chamber is provided in the truss assembled, and when the guides are positioned relative the stops at the opposite side, a standard chamber is provided in the truss assembled.

37. A rigging table for assembling trusses comprising:
a base configured for operative coupling with the rigging table having a generally longitudinal axis and a generally lateral extent;
a bunk assembly
comprising:
a frame;
a pair of guides operatively coupled to the frame;
a pair of stop portions, each stop portion operatively coupled to one of the pair of guides, and configured to position a chord of a truss during assembly; and a pair of clamp members, each clamp member operatively coupled to one of the pair of guides, and configured to secure the chord to one or more webs of the truss during assembly;

wherein the frame of the bunk assembly is moveable along the longitudinal axis of the base; and wherein at least one of the pair of guides is slidably positioned on the frame to move generally transverse to the longitudinal axis of the base toward and away from the other guide and able to be fastened in position on the frame to accommodate assembly of different sized trusses.

\* \* \* \* \*